(12) United States Patent
Kira et al.

(10) Patent No.: US 12,729,346 B2
(45) Date of Patent: Sep. 8, 2026

(54) COMPRESSOR AND REFRIGERATION CYCLE APPARATUS

(71) Applicant: DAIKIN INDUSTRIES, LTD., Osaka (JP)

(72) Inventors: Arisa Kira, Osaka (JP); Masaru Tanaka, Osaka (JP); Hideki Matsuura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/624,498

(22) Filed: Apr. 2, 2024

(65) Prior Publication Data

US 2024/0247205 A1 Jul. 25, 2024

Related U.S. Application Data

(63) Continuation-in-part of application No. PCT/JP2023/034706, filed on Sep. 25, 2023.

(30) Foreign Application Priority Data

Sep. 30, 2022 (JP) ................................ 2022-159036

(51) Int. Cl.
*C10M 107/24* (2006.01)
*C09K 5/04* (2006.01)
(Continued)

(52) U.S. Cl.
CPC ........... *C10M 107/24* (2013.01); *C09K 5/045* (2013.01); *C09K 2205/122* (2013.01);
(Continued)

(58) Field of Classification Search
CPC ............ C10M 171/008; C10M 107/24; C10M 2207/2835; C10M 2209/043; C09K 5/045;
(Continued)

(56) References Cited

U.S. PATENT DOCUMENTS

2019/0128249 A1 5/2019 Cota et al.

FOREIGN PATENT DOCUMENTS

JP 2004-11026 A 1/2004
JP 2009-222033 A 10/2009
(Continued)

OTHER PUBLICATIONS

Extended European Search Report for European Application No. 24714756.4, dated Feb. 28, 2025.

(Continued)

*Primary Examiner* — Vishal V Vasisth
(74) *Attorney, Agent, or Firm* — Birch, Stewart, Kolasch & Birch, LLP

(57) ABSTRACT

A compressor is a compressor for a refrigeration cycle apparatus that performs a refrigeration cycle using a refrigerant containing a hydrofluoroolefin and a refrigeration oil containing a polyol ester or a polyvinyl ether. The compressor includes a sliding portion. The sliding portion is formed of an aluminum alloy containing from 5 wt % to 25 wt % of silicon. The refrigeration oil contains an acid scavenger or an oxygen scavenger and satisfies the following relational formula: total content (wt %) of acid scavenger and oxygen scavenger in refrigeration oil≥(2.3+2.6×(hydrofluoroolefin content (wt %) in refrigerant)−1.6×(silicon content (wt %) in sliding portion))/100.

7 Claims, 3 Drawing Sheets

(51) Int. Cl.

| | |
|---|---|
| *C10N 30/06* | (2006.01) |
| *C10N 30/10* | (2006.01) |
| *C10N 30/12* | (2006.01) |
| *C10N 40/30* | (2006.01) |

(52) U.S. Cl.
CPC .... *C09K 2205/126* (2013.01); *C09K 2205/22* (2013.01); *C09K 2205/24* (2013.01); *C10M 2209/043* (2013.01); *C10N 2030/06* (2013.01); *C10N 2030/10* (2013.01); *C10N 2030/12* (2013.01); *C10N 2040/30* (2013.01)

(58) Field of Classification Search
CPC .................. C09K 5/04; C09K 2205/24; C09K 2205/122; C09K 2205/126; C09K 2205/22; F04C 29/00; F04B 39/00; F25B 1/00; C10N 2030/10; C10N 2040/30; C10N 2030/12; C10N 2030/06; C10N 2020/101
See application file for complete search history.

(56) References Cited

FOREIGN PATENT DOCUMENTS

| | | | |
|---|---|---|---|
| JP | 2010-265777 | A | 11/2010 |
| JP | 2016-130589 | A | 7/2016 |
| JP | 2018-71512 | A | 5/2018 |

OTHER PUBLICATIONS

International Search Report for International Application No. PCT/JP2023/034706, dated Dec. 12, 2023, with an English translation,.
International Search Report for International Application No. PCT/JP2024/010812, dated Jun. 11, 2024 with an English translation.
Written Opinion of the International Searching Authority for International Application No. PCT/JP2023/034706, dated Dec. 12, 2023, with an English translation.
Written Opinion of the International Searching Authority for International Application No. PCT/JP2024/010812, dated Jun. 11, 2024, with an English translation.

COMPRESSOR AND REFRIGERATION CYCLE APPARATUS

CROSS REFERENCE TO RELATED APPLICATIONS

This application is a Continuation-In-Part of PCT International Application No. PCT/JP2023/034706, filed on Sep. 25, 2023, which claims priority under 35 U.S.C. § 119(a) to Patent Application No. JP 2022-159036, filed in Japan on Sep. 30, 2022, all of which are hereby expressly incorporated by reference into the present application.

TECHNICAL FIELD

The present disclosure relates to compressors and refrigeration cycle apparatuses.

BACKGROUND ART

Conventionally, refrigeration cycle apparatuses including a refrigerant circuit that performs a refrigeration cycle are widely applied to air conditioning apparatuses, water heaters, and the like.

PTL 1 (Japanese Unexamined Patent Application Publication No. 2010-265777) discloses a refrigeration cycle apparatus of this type. The refrigerant circuit in PTL 1 uses a refrigerant mixture containing HFO-1234yf or HFO-1234yf as one component. This refrigerant contains no chlorine atoms or bromine atoms and is known to have less effect on ozone layer depletion.

SUMMARY

After conducting intensive research to inhibit corrosion of sliding portions of a compressor, the inventors of the present application have newly found that the inhibition of corrosion of sliding portions formed of an aluminum alloy is associated with the amount of hydrofluoroolefin contained in the refrigerant and the amount of silicon contained in the aluminum alloy that forms the sliding portions. Based on these findings, the inventors of the present application have conducted further research and have completed the contents of the present disclosure. The present disclosure provides use as a refrigerant and a refrigeration cycle apparatus according to the following aspects.

A compressor of a first aspect is a compressor for a refrigeration cycle apparatus that performs a refrigeration cycle using a refrigerant containing a hydrofluoroolefin and a refrigeration oil containing a polyol ester or a polyvinyl ether. The compressor includes a sliding portion. The sliding portion is formed of an aluminum alloy containing from 5 wt % to 25 wt % of silicon. The refrigeration oil contains an acid scavenger or an oxygen scavenger and satisfies the following relational formula:

$$\text{total content (wt \%) of acid scavenger and oxygen scavenger in refrigeration oil} \geq (2.3+2.6\times(\text{hydrofluoroolefin content (wt \%) in refrigerant})-1.6\times(\text{silicon content (wt \%) in sliding portion}))/100$$

DESCRIPTION OF EMBODIMENTS

An air conditioning apparatus 20 serving as an example of a refrigeration cycle apparatus will be described by way of example.

(1) Overall Configuration of Air Conditioning Apparatus

Figure 1:
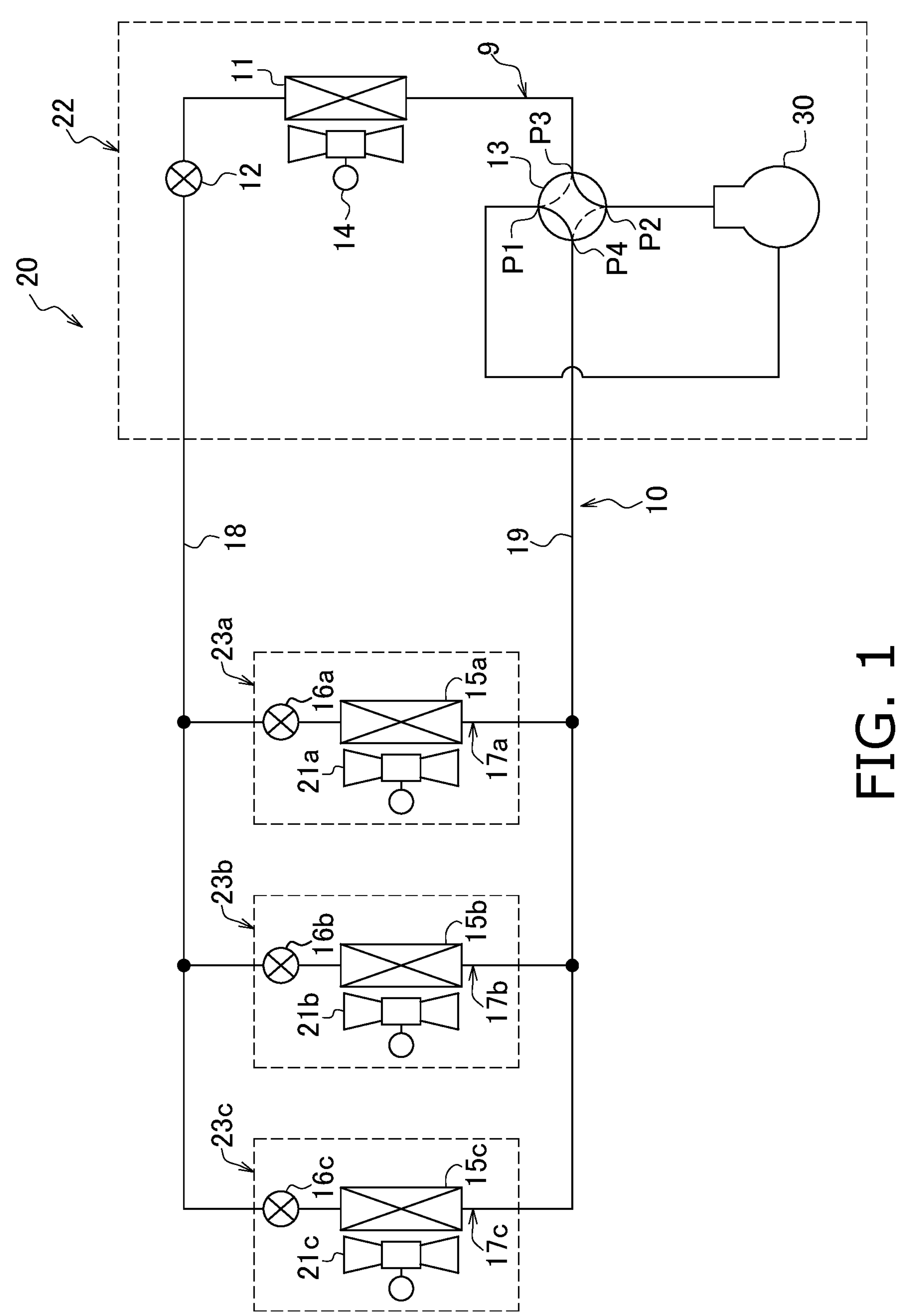
FIG. 1 is a schematic diagram of a refrigeration cycle apparatus according to an embodiment.

As illustrated in FIG. 1, the air conditioning apparatus 20 of this embodiment includes an outdoor unit 22 and three indoor units 23*a*, 23*b*, and 23*c*. The number of indoor units 23 is merely illustrative.

The above air conditioning apparatus 20 includes a refrigerant circuit 10 that is filled with a refrigerant and that performs a refrigeration cycle. The refrigerant circuit 10 includes an outdoor circuit 9 housed in the outdoor unit 22, indoor circuits 17*a*, 17*b*, and 17*c* housed in the respective indoor units 23, and a liquid-side connection pipe 18 and a gas-side connection pipe 19 connecting these indoor circuits 17*a*, 17*b*, and 17*c* to the outdoor circuit 9. These indoor circuits 17*a*, 17*b*, and 17*c* are connected in parallel with each other to the outdoor circuit 9.

As the refrigerant, the refrigerant circuit 10 of this embodiment is filled with a refrigerant containing a hydrofluoroolefin. Examples of hydrofluoroolefins include 2,3,3,3-tetrafluoro-1-propene (hereinafter referred to as "HFO-1234yf"), 1,2,3,3-tetrafluoro-1-propene (hereinafter referred to as "HFO-1234ye"), 1,3,3,3-tetrafluoropropene (hereinafter referred to as "HFO-1234ze"), 3,3,3-trifluoro-1-propene (hereinafter referred to as "HFO-1243zf"), 1,1,2-trifluoroethylene (hereinafter referred to as "HFO-1123"), 1,2-difluoroethylene (hereinafter referred to as "HFO-1132"), 1,1-difluoroethylene (hereinafter referred to as "HFO-1132a"), monofluoroethylene (hereinafter referred to as "HFO-1141"), 1,2,3,3,3-pentafluoro-1-propene (hereinafter referred to as HFO-1225ye), 1,2,2-trifluoro-1-propene, 2-fluoro-1-propene, and refrigerant mixtures thereof. 1,2-Difluoroethylene may be trans-1,2-difluoroethylene ((E)-HFO-1132), cis-1,2-difluoroethylene ((Z)-HFO-1132), or a mixture thereof.

The refrigerant may be a refrigerant containing a hydrofluoroolefin or a refrigerant composed only of a hydrofluoroolefin.

The refrigerant may be a refrigerant mixture containing, as a component other than the above hydrofluoroolefin, for example, at least one of difluoromethane (hereinafter referred to as "HFC-32"), pentafluoroethane (hereinafter referred to as "HFC-125"), 1,1,2,2-tetrafluoroethane (hereinafter referred to as "HFC-134"), 1,1,1,2-tetrafluoroethane (hereinafter referred to as "HFC-134a"), 1,1,1-trifluoroethane (hereinafter referred to as "HFC-143a"), 1,1-difluoroethane (hereinafter referred to as "HFC-152a"), HFC-161, HFC-227ea, HFC-236ea, HFC-236fa, HFC-365mfc, methane, ethane, propane, propene, butane, isobutane, pentane, 2-methylbutane, cyclopentane, dimethyl ether, bistrifluoromethyl sulfide, carbon dioxide, and helium.

For example, as the refrigerant, a two-component refrigerant mixture composed of HFO-1234yf and HFC-32 may be used. In this case, the refrigerant mixture of HFO-1234yf and HFC-32 preferably contains from 30 wt % to 80 wt % of HFO-1234yf and from 20 wt % to 70 wt % of HFC-32 from the viewpoint of performance for use in a refrigeration cycle apparatus.

A refrigerant mixture of HFO-1234yf and HFC-125 may also be used. In this case, the refrigerant mixture preferably contains 10 wt % or more, more preferably from 10 wt % to 20 wt %, of HFC-125.

A three-component refrigerant mixture composed of HFO-1234yf, HFC-32, and HFC-125 may also be used.

(2) Outdoor Circuit

The outdoor circuit 9 includes a compressor 30, an outdoor heat exchanger 11, an outdoor expansion valve 12, and a four-way switching valve 13.

The compressor 30 is configured as, for example, an inverter compressor whose operating capacity is variable. The compressor 30 is supplied with electric power through an inverter. The compressor 30 has the discharge side thereof connected to a second port P2 of the four-way switching valve 13 and the suction side thereof connected to a first port P1 of the four-way switching valve 13. The details of the compressor 30 will be described later.

The outdoor heat exchanger 11 is configured as a cross-fin-type fin-and-tube heat exchanger. An outdoor fan 14 is disposed near the outdoor heat exchanger 11. The outdoor heat exchanger 11 exchanges heat between outdoor air and the refrigerant. The outdoor heat exchanger 11 has one end thereof connected to a third port P3 of the four-way switching valve 13 and the other end thereof connected to the outdoor expansion valve 12. In addition, a fourth port P4 of the four-way switching valve 13 is connected to the gas-side connection pipe 19.

The outdoor expansion valve 12 is disposed between the outdoor heat exchanger 11 and the liquid-side end of the outdoor circuit 9. The outdoor expansion valve 12 is configured as an electronic expansion valve whose degree of opening is variable.

The four-way switching valve 13 is configured to be freely switchable between a first state in which the first port P1 and the fourth port P4 communicate and the second port P2 and the third port P3 communicate, that is, a state indicated by the solid lines in FIG. 1, and a second state in which the first port P1 and the third port P3 communicate and the second port P2 and the fourth port P4 communicate, that is, a state indicated by the broken lines in FIG. 1.

(3) Indoor Circuits

The indoor circuits 17*a*, 17*b*, and 17*c* include, in order from the gas-side ends thereof toward the liquid-side ends thereof, indoor heat exchangers 15*a*, 15*b*, and 15*c* and indoor expansion valves 16*a*, 16*b*, and 16*c*, respectively.

The indoor heat exchangers 15*a*, 15*b*, and 15*c* are configured as cross-fin-type fin-and-tube heat exchangers. Indoor fans 21*a*, 21*b*, and 21*c* are disposed near the indoor heat exchangers 15*a*, 15*b*, and 15*c*, respectively. The indoor heat exchangers 15 exchange heat between indoor air and the refrigerant. In addition, the indoor expansion valves 16*a*, 16*b*, and 16*c* are configured as electronic expansion valves whose degree of opening is variable.

(4) Configuration of Compressor

Figure 2:
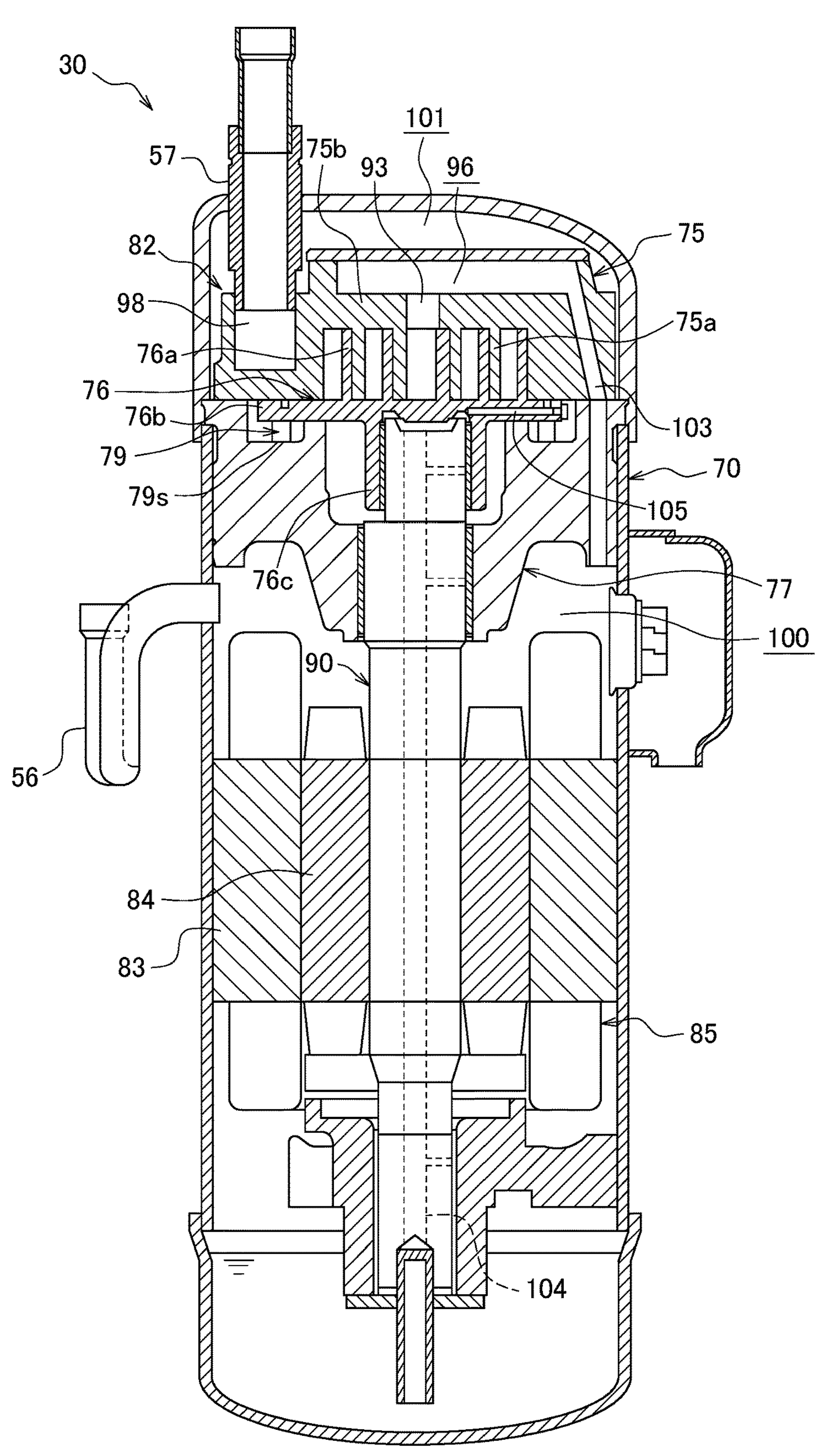
FIG. 2 is a longitudinal sectional view of a compressor according to the embodiment.
Figure 3:
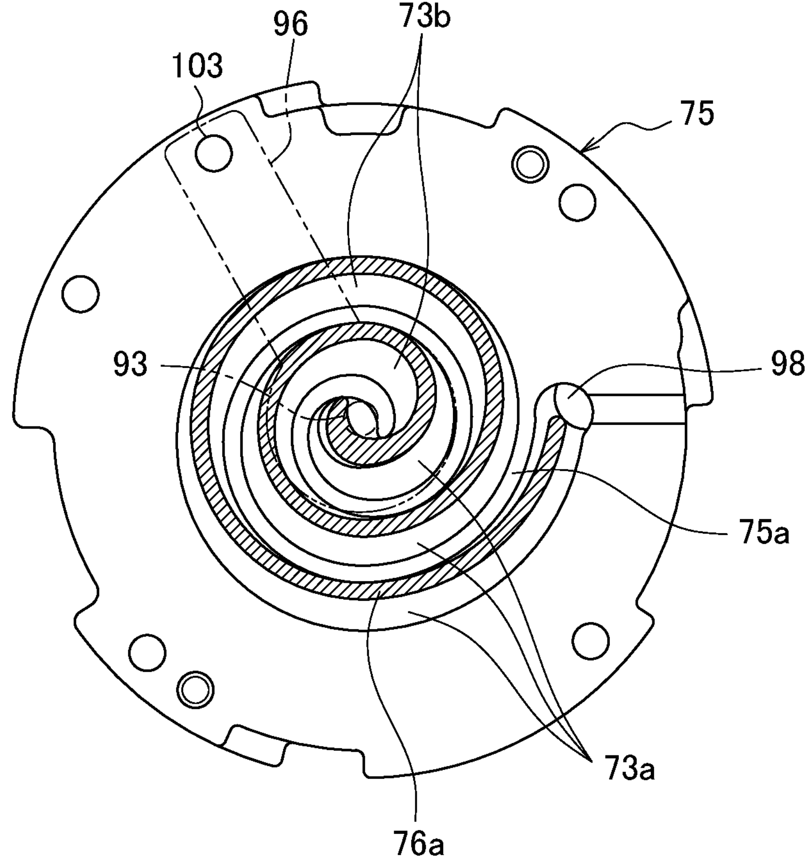
FIG. 3 is a cross-sectional view of a compression mechanism of the compressor according to the embodiment.

The compressor 30 is configured as, for example, a fully hermetic high-pressure dome-type scroll compressor. The configuration of the compressor 30 will be described with reference to FIGS. 2 and 3.

The compressor 30 includes a casing 70 that forms a vertical hermetic container. The casing 70 has, in order from bottom to top, an electric motor 85 and a compression mechanism 82 disposed therein.

The electric motor 85 includes a stator 83 and a rotor 84. The stator 83 is fixed to the barrel of the casing 70. On the other hand, the rotor 84 is disposed inside the stator 83 and has a crankshaft 90 coupled thereto.

The compression mechanism 82 includes a movable scroll 76 and a fixed scroll 75 that constitute a scroll compression mechanism. The movable scroll 76 includes a substantially circular movable-side end plate 76*b* and a spiral movable-side wrap 76*a*. The movable-side wrap 76*a* is disposed perpendicularly on the front surface, that is, the upper surface, of the movable-side end plate 76*b*. In addition, a cylindrical projection 76*c* having an eccentric portion of the crankshaft 90 inserted therein is disposed perpendicularly on the back surface, that is, the lower surface, of the movable-side end plate 76*b*. The movable scroll 76 is supported by a housing 77 disposed under the movable scroll 76 with an Oldham ring 79 therebetween. On the other hand, the fixed scroll 75 includes a substantially circular fixed-side end plate 75*b* and a spiral fixed-side wrap 75*a*. The fixed-side wrap 75*a* is disposed perpendicularly on the front surface, that is, the lower surface, of the fixed-side end plate 75*b*. In the compression mechanism 82, the fixed-side wrap 75*a* and the movable-side wrap 76*a* mesh with each other to form a plurality of compression chambers 73 between contact portions of the two wraps 75*a* and 76*a*.

In the compressor 30 of this embodiment, which employs a so-called asymmetric spiral structure, the fixed-side wrap 75*a* and the movable-side wrap 76*a* differ in number of turns, that is, spiral length. The plurality of compression chambers 73 include first compression chambers 73*a* formed between the inner circumferential surface of the fixed-side wrap 75*a* and the outer circumferential surface of the movable-side wrap 76*a* and second compression chambers 73*b* formed between the outer circumferential surface of the fixed-side wrap 75*a* and the inner circumferential surface of the movable-side wrap 76*a*.

The compression mechanism 82 has a suction port 98 formed at the outer periphery of the fixed scroll 75. The suction port 98 has connected thereto a suction pipe 57 extending through the top of the casing 70. During the orbital motion of the movable scroll 76, the suction port 98 communicates intermittently with the first compression chambers 73*a* and the second compression chambers 73*b*. The suction port 98 also has a suction check valve (not illustrated) that blocks a flow of the refrigerant from the compression chambers 73 back into the suction pipe 57.

In addition, the compression mechanism 82 has a discharge port 93 formed at the center of the fixed-side end plate 75*b*. During the orbital motion of the movable scroll 76, the discharge port 93 communicates intermittently with the first compression chambers 73*a* and the second compression chambers 73*b*. The discharge port 93 is open in a muffler space 96 formed on the upper side of the fixed scroll 75.

The space in the casing 70 is divided into an upper suction space 101 and a lower discharge space 100 by the disc-shaped housing 77. The suction space 101 communicates with the suction port 98 through a communication port (not illustrated). The discharge space 100 communicates with the muffler space 96 through a connection passage 103 formed through the fixed scroll 75 and the housing 77. During operation, refrigerant discharged from the discharge port 93 flows through the muffler space 96 into the discharge space 100, which becomes a high-pressure space filled with the refrigerant compressed by the compression mechanism 82.

A discharge pipe 56 extending through the barrel of the casing 70 is open in the discharge space 100.

As components formed of organic materials, an insulating covering material for windings of the stator 83, an insulating film, and a seal material for the compression mechanism 82 are used in the casing 70 of the compressor 30 of this embodiment. For these components, materials are used that are not susceptible to physical or chemical alteration by refrigerant upon contact with high-temperature, high-pressure refrigerant and, particularly, have solvent resistance, extraction resistance, thermal and chemical stability, and anti-foaming properties.

Specifically, as the insulating covering material for the windings of the stator 83, polyvinyl formal, a polyester, a THEIC-modified polyester, a polyamide, a polyamideimide, a polyesterimide, or a polyesteramideimide is used. A double-covered wire having an upper layer of a polyamide-imide and a lower layer of a polyesterimide is preferred. Besides the above materials, an enamel covering having a glass transition temperature of 120° ° C. or higher may be used.

In addition, as the insulating film, polyethylene terephthalate (PET), polyethylene naphthalate (PEN), polyphenylene sulfide (PPS), or polybutylene terephthalate (PBT) is used. A foamed film obtained using the same foaming material as the refrigerant in the refrigeration cycle may also be used as the insulating film. As an insulating material, such as an insulator, for holding the windings, a polyetheretherketone (PEEK) or a liquid crystal polymer (LCP) is used. As a varnish, an epoxy resin is used. In addition, as the seal material, polytetrafluoroethylene, a packing formed of aramid fiber or NBR, a perfluoroelastomer, a silicone rubber, a hydrogenated NBR rubber, or a fluoroelastomer is used.

In addition, an oil sump where a refrigeration oil is stored is formed at the bottom of the casing 70. In addition, a first oil supply passage 104 that is open in the oil sump is formed inside the crankshaft 90. In addition, a second oil supply passage 105 connected to the first oil supply passage 104 is formed in the movable-side end plate **76*b*. In this compressor 30, the refrigeration oil is supplied from the oil sump through the first oil supply passage 104 and the second oil supply passage 105 to the compression chambers 73** on the low-pressure side.

As described above, the Oldham ring 79 is disposed between the movable scroll 76 and the housing 77. The Oldham ring 79 constitutes a rotation preventing mechanism for preventing the rotation of the movable scroll 76. The Oldham ring 79 is ring-shaped and has scroll keys protruding on the upper side thereof at positions opposite to each other. The Oldham ring 79 also has a pair of housing keys protruding on the lower side thereof at positions 90° apart from the scroll keys in the circumferential direction. That is, the Oldham ring 79 has the scroll keys and the housing keys arranged alternately at positions 90° apart from each other in the ring circumferential direction.

First guide grooves extending radially and corresponding to the scroll keys of the Oldham ring 79 are formed on the back side of the movable-side end plate **76*b* of the above movable scroll 76. In addition, second guide grooves extending radially and corresponding to the housing keys of the Oldham ring 79 are formed in the upper surface of the housing 77. The Oldham ring 79 is configured such that the scroll keys are slidably fitted into the first guide grooves and the housing keys are slidably fitted into the second guide grooves. In this way, the Oldham ring 79 prevents the movable scroll 76 from rotating and permits only orbital motion, that is, revolving motion, during the rotation of the crankshaft 90. Thus, the Oldham ring 79 has a sliding surface in sliding contact with the movable scroll 76 and a sliding surface in sliding contact with the housing 77**.

The Oldham ring 79 of this embodiment is formed in its entirety of a silicon-containing aluminum alloy referred to as "high-silicon aluminum material". The aluminum alloy that forms the Oldham ring 79 has a silicon content of from 5 wt % to 25 wt %. The Oldham ring 79 includes a sliding portion **79*s* that is a portion disposed in sliding contact with the movable scroll 76 or the housing 77 such that the portion can come into contact with the refrigerant and the refrigeration oil. The sliding portion 79*s* is formed of an aluminum alloy containing from 5 wt % to 25 wt % of silicon. Alternatively, it is possible to form only the outer surface serving as the sliding portion 79*s* of the Oldham ring 79 as a separate part using the above aluminum alloy. A preferred lower limit of the silicon content of the aluminum alloy for the sliding portion 79*s* is, for example, 7 wt %. A preferred upper limit of the silicon content of the aluminum alloy for the sliding portion 79*s*** is 20 wt %, more preferably 18 wt %, which allows the use of an expensive aluminum alloy having high silicon content to be reduced.

(5) Refrigeration Oil

In this embodiment, a refrigeration oil containing, as a main component, at least one of two base oils, namely, a polyol ester and a polyvinyl ether, is used for the compressor 30. For example, of these two base oils, a refrigeration oil containing a polyvinyl ether as a main component is used as the refrigeration oil of this embodiment. Here, "main component" refers to a component present in the highest weight ratio in the refrigeration oil.

As the refrigeration oil of this embodiment, a refrigeration oil containing, as a main component, a polyvinyl ether having a structural unit represented by general formula I below is used. Among polyvinyl ethers, a polyvinyl ether of this structure has excellent miscibility with a refrigerant having one double bond in the molecular structure thereof.

[Chem. 1]

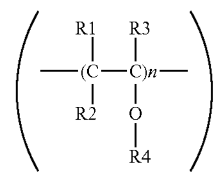

(I)

In general formula I, R1, R2, and R3 each represent hydrogen or a hydrocarbon group having from 1 to 8 carbon atoms. R1, R2, and R3 may be the same or different from each other. In addition, in the structural units represented by general formula I, R4 has a composition including from 40% to 100% of an alkyl group having 1 or 2 carbon atoms and from 0% to 60% of an alkyl group having 3 or 4 carbon atoms.

The above refrigeration oil has a kinematic viscosity at 40° C. of from 30 cSt to 400 cSt, a pour point of −30° C. or lower, a surface tension at 20° C. of from 0.02 N/m to 0.04 N/m, and a density at 15° C. of from 0.8 g/cm$^3$ to 1.8 g/cm$^3$. In addition, the refrigeration oil has a saturation moisture content of 2,000 ppm or more at a temperature of 30° C. and a relative humidity of 90% and an aniline point within a predetermined numerical range. Here, "aniline point" is a value indicating the solubility of, for example, a hydrocarbon-based solvent, and refers to a temperature at which a mixture of a sample (here, the refrigeration oil) with an equal volume of aniline can no longer dissolve in each other and starts becoming cloudy when cooled (the details are defined in JIS K 2256). These values are those of the refrigeration oil itself, with no refrigerant dissolved therein. This also applies to refrigeration oils described in other embodiments.

In this embodiment, the polyvinyl ether serving as the main component of the refrigeration oil has miscibility with the hydrofluoroolefin serving as the refrigerant. In addition, the refrigeration oil has a kinematic viscosity at 40° C. of 400 cSt or less. Thus, the hydrofluoroolefin serving as the refrigerant dissolves to some extent in the refrigeration oil. In addition, since the refrigeration oil has a pour point of −30° C. or lower, the refrigeration oil can maintain its flowability in portions of the refrigerant circuit 10 at relatively low temperatures. In addition, since the refrigeration oil has a surface tension at 20° C. of 0.04 N/m or less, the refrigeration oil discharged from the compressor 30 is unlikely to form large droplets that are not readily carried away by the refrigerant. Thus, the refrigeration oil discharged from the compressor 30 dissolves in the refrigerant and returns to the compressor 30 together with the refrigerant.

In addition, since the refrigeration oil has a kinematic viscosity at 40° C. of 30 cSt or more, the refrigeration oil does not exhibit insufficient oil film strength due to too low kinematic viscosity and maintains its lubrication performance. In addition, since the refrigeration oil has a surface tension at 20° ° C. of 0.02 N/m or more, the refrigeration oil is unlikely to form small droplets in the gas refrigerant in the compressor 30 and is not discharged in large amounts from the compressor 30. Thus, a sufficient amount of refrigeration oil stored in the compressor 30 can be ensured.

In addition, since the refrigeration oil has a saturation moisture content of 2,000 ppm or more at a temperature of 30° C. and a relative humidity of 90%, the refrigeration oil has relatively high hygroscopicity. This allows the refrigeration oil to capture moisture to some extent from the refrigerant. The hydrofluoroolefin has a molecular structure that tends to alter or deteriorate due to the effect of moisture contained therein. Accordingly, such deterioration can be inhibited by the hygroscopic effect of the refrigeration oil.

Furthermore, when the refrigeration oil has an aniline point within a predetermined numerical range, the refrigeration oil exhibits improved compatibility with a predetermined resin functional component (a functional component made of an organic material and disposed such that the component can come into contact with the refrigeration oil and the refrigerant, e.g., a sliding member or a seal member). That is, when the refrigeration oil has an aniline point within a predetermined numerical range, the resin functional component can be prevented from swelling or shrinking due to the effect of the refrigeration oil, and the loss of the function of the resin functional component can be avoided.

In addition, as additives, the refrigeration oil of this embodiment contains an acid scavenger or an oxygen scavenger and optionally further contains an extreme pressure additive, an antioxidant, a defoamer, an oiliness agent, and a copper deactivator. The amounts of additives other than the acid scavenger and the oxygen scavenger are preferably set such that those additives are present in the refrigeration oil in amounts of from 0.01 wt % to 5 wt %.

The total amount of acid scavenger and oxygen scavenger added satisfies the following relational formula. However, as described above, the acid scavenger or the oxygen scavenger may be added alone.

$$\text{Total content (wt \%) of acid scavenger and oxygen scavenger in refrigeration oil} \geq (2.3 + 2.6 \times (\text{hydrofluoroolefin content (wt \%) in refrigerant}) - 1.6 \times (\text{silicon content (wt \%) in sliding portion}))/100$$

The above relational formula was obtained in the following manner. A plurality of aluminum alloys having different silicon contents were provided and used to form rings for a thrust sliding test. The rings were used to perform a thrust sliding test with varying hydrofluoroolefin contents and varying total amounts of acid scavenger and oxygen scavenger added to the refrigeration oil. As the test conditions, the speed was set to 5 cm/sec. In the thrust sliding test, combinations of hydrofluoroolefin contents and total amounts of acid scavenger and oxygen scavenger added immediately before ring seizure were plotted for each ring to obtain a regression line. The equation of this regression line was used to derive the above relational formula.

$$F1 \text{ is defined as } (2.3 + 2.6 \times (\text{hydrofluoroolefin content (wt \%) in refrigerant}) - 1.6 \times (\text{silicon content (wt \%) in sliding portion}))/100.$$

F1 is a measure of the amount of acid that can be captured from the refrigerant by the acid scavenger and the oxygen scavenger.

When the total content of the acid scavenger and the oxygen scavenger in the refrigeration oil is less than F1, the acid scavenger and the oxygen scavenger capture an insufficient amount of acid, and uncaptured acid tends to corrode aluminum components.

When the total content of the acid scavenger and the oxygen scavenger in the refrigeration oil is more than or equal to F1, the acid scavenger and the oxygen scavenger capture a sufficient amount of acid, and corrosion of aluminum components can be inhibited.

When the refrigerant is composed only of one or more hydrofluoroolefins, the total amount of acid scavenger and oxygen scavenger added is, for example, preferably more than 3.0 wt %, more preferably more than 3.2 wt %.

The upper limit of the total amount of acid scavenger and oxygen scavenger added is, for example, 10.0 wt %. When the total amount of acid scavenger and oxygen scavenger added is more than 10.0 wt %, the refrigeration oil exhibits decreased viscosity. As a result, the lubrication performance decreases, and wear tends to occur. From the viewpoint of reducing the decrease in the viscosity of the refrigeration oil, the upper limit of the total content of the acid scavenger and the oxygen scavenger in the refrigeration oil is, for example, preferably "F1+5.0 wt %", more preferably "F1+2.0 wt %".

Examples of acid scavengers that can be used include phenyl glycidyl ether, alkyl glycidyl ethers, alkylene glycol glycidyl ethers, cyclohexene oxide, α-olefin oxides, and epoxy compounds such as epoxidized soybean oil. Of these acid scavengers, phenyl glycidyl ether, alkyl glycidyl ethers, alkylene glycol glycidyl ethers, cyclohexene oxide, and α-olefin oxides are preferred from the viewpoint of miscibility with the refrigerant. The alkyl groups of alkyl glycidyl ethers and the alkylene groups of alkylene glycol glycidyl ethers may be branched. These preferably have from 3 to 30 carbon atoms, more preferably from 4 to 24 carbon atoms, even more preferably from 6 to 16 carbon atoms. In addition, α-olefin oxides may have a total of from 4 to 50 carbon atoms, more preferably from 4 to 24 carbon atoms, even more preferably from 6 to 16 carbon atoms. A single acid scavenger may be used alone, or a plurality of acid scavengers may be used in combination.

Examples of oxygen scavengers that can be used include sulfur-containing aromatic compounds such as 4,4'-thiobis(3-methyl-6-tert-butylphenol), diphenyl sulfide, dioctyldiphenyl sulfide, dialkyldiphenylene sulfide, benzothiophene, dibenzothiophene, phenothiazine, benzothiapyran, thiapyran, thianthrene, dibenzothiapyran, and diphenylene disulfide; aliphatic unsaturated compounds such as various olefins, dienes, and trienes; and terpenes having a double bond. A single oxygen scavenger may be used alone, or a plurality of oxygen scavengers may be used in combination.

As the extreme pressure additive, those containing a phosphate ester can be used. Examples of phosphate esters that can be used include phosphate esters, phosphite esters, acidic phosphate esters, and acidic phosphite esters. Examples of extreme pressure additives that can be used also include those containing amine salts of phosphate esters such as phosphate esters, phosphite esters, acidic phosphate esters, and acidic phosphite esters.

Extreme pressure additives other than those listed above can also be added. Examples of other extreme pressure additives that can be used include organosulfur compound-based extreme pressure additives such as monosulfides, polysulfides, sulfoxides, sulfones, thiosulfinates, sulfurized oils and fats, thiocarbonates, thiophenes, thiazoles, and methanesulfonate esters; thiophosphate ester-based extreme pressure additives such as thiophosphate triesters; ester-based extreme pressure additives such as higher fatty acids, hydroxyaryl fatty acids, polyhydric alcohol esters, and acrylate esters; organochlorine-based extreme pressure additives such as chlorinated hydrocarbons and chlorinated carboxylic acid derivatives; organofluorine-based extreme pressure additives such as fluorinated aliphatic carboxylic acids, fluorinated ethylene resins, fluorinated alkylpolysiloxanes, and fluorinated graphite; alcohol-based extreme pressure additives such as higher alcohols; and metal compound-based extreme pressure additives such as naphthenate salts (e.g., lead naphthenate), fatty acid salts (e.g., fatty acid lead salts), thiophosphate salts (e.g., zinc dialkyldithiophosphate), thiocarbamate salts, organomolybdenum compounds, organotin compounds, organogermanium compounds, and borate esters.

In addition, as the antioxidant, phenol-based antioxidants and amine-based antioxidants can be used. Examples of phenol-based antioxidants include 2,6-di-tert-butyl-4-methylphenol (DBPC), 2,6-di-tert-butyl-4-ethylphenol, 2,2'-methylenebis(4-methyl-6-tert-butylphenol), 2,4-dimethyl-6-tert-butylphenol, and 2,6-di-tert-butylphenol. In addition, examples of amine-based antioxidants include N,N'-diisopropyl-p-phenylenediamine, N,N'-di-sec-butyl-p-phenylenediamine, phenyl-α-naphthylamine, and N,N'-diphenyl-p-phenylenediamine. As the antioxidant, oxygen scavengers, which capture oxygen, can also be used.

In addition, as the copper deactivator, benzotriazole and derivatives thereof and the like can be used. As the defoamer, silicon compounds can be used. As the oiliness agent, higher alcohols can be used.

In addition, the refrigeration oil of this embodiment can optionally contain additives such as load additives, chlorine scavengers, detergent-dispersant additives, viscosity index improvers, rust inhibitors, stabilizers, corrosion inhibitors, and pour point depressants. The amounts of additives may be set such that those additives are present in the refrigeration oil in amounts of from 0.01 wt % to 5 wt %, preferably from 0.05 wt % to 3 wt %. In addition, the refrigeration oil of this embodiment has a chlorine concentration of 50 ppm or less and a sulfur concentration of 50 ppm or less.

(6) Overall Operation

The operation of the above air conditioning apparatus 20 will be described. This air conditioning apparatus 20 is capable of performing a cooling operation and a heating operation and is switched between the cooling operation and the heating operation by the four-way switching valve 13.

(6-1) Cooling Operation

In the cooling operation, the four-way switching valve 13 is set to the first state. When the compressor 30 operates in this state, high-pressure refrigerant discharged from the compressor 30 releases heat into outdoor air and condenses through the outdoor heat exchanger 11. The refrigerant condensed through the outdoor heat exchanger 11 is distributed to the individual indoor circuits 17. The refrigerant flowing into each indoor circuit 17 is decompressed by the indoor expansion valve 16 and then absorbs heat from indoor air and evaporates through the indoor heat exchanger 15. On the other hand, the indoor air is cooled and supplied to the indoor space.

The refrigerant evaporated through each indoor circuit 17 combines with the refrigerant evaporated through the other indoor circuits 17 and returns to the outdoor circuit 9. In the outdoor circuit 9, the refrigerant returning from the individual indoor circuits 17 is compressed again by the compressor 30 and is discharged therefrom. In the cooling operation, the degree of opening of each indoor expansion valve 16 is adjusted to perform superheating control such that the degree of superheating of the refrigerant at the outlet of the indoor heat exchanger 15 is maintained at a constant level. The constant level of the degree of superheating of the refrigerant at the outlet of the indoor heat exchanger 15 is, for example, 5° C.

(6-2) Heating Operation

In the heating operation, the four-way switching valve 13 is set to the second state. When the compressor 30 operates in this state, high-pressure refrigerant discharged from the compressor 30 is distributed to the individual indoor circuits 17. The refrigerant flowing into each indoor circuit 17 releases heat into indoor air and condenses through the indoor heat exchanger 15. On the other hand, the indoor air is heated and supplied to the indoor space. The refrigerant condensed through the indoor heat exchangers 15 combines into the outdoor circuit 9.

The refrigerant combined into the outdoor circuit 9 is decompressed by the outdoor expansion valve 12 and then absorbs heat from outdoor air and evaporates through the outdoor heat exchanger 11. The refrigerant evaporated through the outdoor heat exchanger 11 is compressed again by the compressor 30 and is discharged therefrom. In the heating operation, the degree of opening of each indoor expansion valve 16 is adjusted to perform subcooling control such that the degree of subcooling of the refrigerant at the outlet of the indoor heat exchanger 15 is maintained at a constant level. The constant level of the degree of subcooling of the refrigerant at the outlet of the indoor heat exchanger 15 is, for example, 5° C.

(7) Features

7-1

As described above, a refrigerant containing a hydrofluoroolefin such as HFO-1234yf has a molecular structure that is relatively unstable to moisture, oxygen, and the like. Therefore, the refrigerant may deteriorate and produce strong acids such as hydrofluoric acid and trifluoroacetic acid when subjected to refrigeration cycles over a long period of time. When such strong acids are produced, the sliding portions of the compressor 30 may deteriorate or wear due to physical or chemical alteration. As a result, abnormal wear tends to occur in the sliding portions of the compressor 30.

It is contemplated to inhibit corrosion by increasing the Si content in the aluminum components used for the sliding portions of the compressor 30. However, aluminum alloys with high Si contents require special technology and are expensive.

Here, in this embodiment, the total amount of acid scavenger and oxygen scavenger added satisfies the following relational formula:

$$\text{total content (wt \%) of acid scavenger and oxygen scavenger in refrigeration oil} \geq (2.3+2.6\times(\text{hydrofluoroolefin content (wt \%) in refrigerant})-1.6\times(\text{silicon content (wt \%) in sliding portion}))/100$$

F1 is defined as (2.3+2.6×(hydrofluoroolefin content (wt %) in refrigerant)−1.6×(silicon content (wt %) in sliding portion))/100. When the total content of the acid scavenger and the oxygen scavenger in the refrigeration oil is more than or equal to F1, the acid scavenger and the oxygen scavenger can capture a sufficient amount of acid from the refrigerant. Thus, corrosion of aluminum components can be inhibited. As a result, abnormal wear of aluminum components can be inhibited.

7-2

In addition, in this embodiment, the refrigeration oil contains an extreme pressure additive. Thus, corrosion of aluminum components can be further inhibited.

7-3

In addition, in this embodiment, the refrigeration oil contains an antioxidant. Thus, corrosion of aluminum components can be further inhibited.

(8) Other Embodiments

The above embodiment may also be configured as follows.

(8-1) Other Embodiment A

In the above embodiment, the sliding portion 79*s* of the Oldham ring 79 of the compression mechanism 82 is formed of an aluminum alloy containing from 5 wt % to 25 wt % of silicon. This aluminum alloy may also be applied to other sliding portions of the compression mechanism 82.

Specifically, the above aluminum alloy may be applied to, for example, sliding portions of the above movable scroll 76, sliding portions of the crankshaft 90 on bearings such as journal and thrust bearings, and sliding portions of bearings such as journal and thrust bearings on the crankshaft 90.

Examples of sliding portions of the movable scroll 76 include a portion of the projection 76*c* in sliding contact with the eccentric portion of the crankshaft 90, a portion of the movable-side wrap 76*a* in sliding contact with the fixed-side wrap 75*a* of the fixed scroll 75, and a portion of the movable-side end plate 76*b* in sliding contact with the Oldham ring 79.

Members including sliding portions may be formed of the above aluminum alloy in their entirety or may be formed of the above aluminum alloy only in the sliding portions exposed in the sliding surfaces thereof.

(8-2) Other Embodiment B

In addition, in the above embodiment, the compression mechanism 82 of the compressor 30 is configured as a scroll compression mechanism. However, the compression mechanism 82 may be another type of compression mechanism such as a swing compression mechanism, a rotary compression mechanism, or a screw compression mechanism. The above aluminum alloy may also be applied to predetermined sliding portions of such other types of compression mechanisms.

(8-3) Other Embodiment C

In the above embodiment, a case in which, of the two base oils, namely, a polyol ester and a polyvinyl ether, a refrigeration oil containing a polyvinyl ether as a main component is used has been described by way of example. Alternatively, a refrigeration oil containing a polyol ester as a main component may be used as the refrigeration oil.

As the polyol ester, for example, it is preferred to use "an ester of an aliphatic polyhydric alcohol and a linear or branched fatty acid", "a partial ester of an aliphatic polyhydric alcohol and a linear or branched fatty acid", "a complex ester of a partial ester of an aliphatic polyhydric alcohol and a linear or branched fatty acid having from 3 to 9 carbon atoms with an aliphatic dibasic acid or an aromatic dibasic acid", or a mixture thereof. Among polyol esters, these polyol esters have excellent miscibility with hydrofluoroolefin refrigerants.

Examples of aliphatic polyhydric alcohols that can be used to form "an ester or partial ester of an aliphatic polyhydric alcohol and a linear or branched fatty acid" include ethylene glycol, propylene glycol, butylene glycol, neopentyl glycol, trimethylolethane, ditrimethylolethane, trimethylolpropane, ditrimethylolpropane, glycerol, pentaerythritol, dipentaerythritol, tripentaerythritol, and sorbitol. Of these aliphatic polyhydric alcohols, pentaerythritol, dipentaerythritol, and tripentaerythritol are preferred.

In addition, fatty acids having from 3 to 12 carbon atoms can be used, including, for example, propionic acid, butyric acid, pivalic acid, valeric acid, caproic acid, heptanoic acid, octanoic acid, nonanoic acid, decanoic acid, dodecanoic acid, isovaleric acid, neopentanoic acid, 2-methylbutyric acid, 2-ethylbutyric acid, 2-methylhexanoic acid, 2-ethylhexanoic acid, isooctanoic acid, isononanoic acid, isodecanoic acid, 2,2-dimethyloctanoic acid, 2-butyloctanoic acid, and 3,5,5-trimethylhexanoic acid. As fatty acids, fatty acids having from 5 to 12 carbon atoms are preferred, and fatty acids having from 5 to 9 carbon atoms are more preferred. Specifically, valeric acid, hexanoic acid, heptanoic acid, 2-methylhexanoic acid, 2-ethylhexanoic acid, isooctanoic acid, isononanoic acid, isodecanoic acid, 2,2-dimethyloctanoic acid, 2-butyloctanoic acid, 3,5,5-trimethylhexanoic acid, and the like are preferred.

In addition, for "a complex ester of a partial ester of an aliphatic polyhydric alcohol and a linear or branched fatty acid having from 3 to 9 carbon atoms with an aliphatic dibasic acid or an aromatic dibasic acid", fatty acids having from 5 to 7 carbon atoms are preferred, and fatty acids having 5 or 6 carbon atoms are more preferred. Specifically, valeric acid, hexanoic acid, isovaleric acid, 2-methylbutyric acid, 2-ethylbutyric acid, or a mixture thereof is preferred. A mixture of a fatty acid having 5 carbon atoms and a fatty acid having 6 carbon atoms in a weight ratio of from 10:90 to 90:10 can also be used.

In addition, aliphatic dibasic acids include succinic acid, adipic acid, pimelic acid, suberic acid, azaleic acid, sebacic acid, undecanedioic acid, dodecanedioic acid, tridecanedioic acid, and docosanedioic acid. In addition, aromatic dibasic acids include phthalic acid and isophthalic acid. An esterification reaction for preparing a complex ester involves reacting a polyhydric alcohol with a dibasic acid in a predetermined ratio to form a partial ester and then reacting the partial ester with a fatty acid. The dibasic acid and the fatty acid may be reacted in the opposite order, and the dibasic acid and the fatty acid may be mixed together before being subjected to esterification.

In addition, the refrigeration oil may contain a polyalkylene glycol. From the viewpoint of achieving good miscibility with hydrofluoroolefin refrigerants, the polyalkylene glycol is preferably a polyalkylene glycol having a molecular structure represented by the molecular formula: $R1(R2)_m(R30)_nR4$ (where m and n are integers, R1 and R4 each represent hydrogen, an alkyl group having from 1 to 6 carbon atoms, or an aryl group, and R2 and R3 each represent an alkyl group having from 1 to 4 carbon atoms).

(8-4) Other Embodiment D

In addition, in the above embodiment, the refrigerant circuit 10 may include a dryer charged with silicic acid or synthetic zeolite as a desiccant.

(8-5) Other Embodiment E

In addition, in the above embodiment, the refrigeration cycle apparatus 20 may be an air conditioning apparatus for heating only, a refrigerator or freezer for cooling food, a refrigeration cycle apparatus in which an air conditioner and a refrigerator or freezer are combined together, or a water heater for heating water with a radiator of the refrigerant circuit 10.

The foregoing embodiments are essentially presented as preferred examples and are not intended to limit the present disclosure, articles to which the present disclosure is applied, or the range of applications thereof.

Others

The compressor of the first aspect uses a refrigeration oil containing an acid scavenger and an oxygen scavenger and satisfying the above formula. This inhibits corrosion of the sliding portion of the compressor due to deterioration of the refrigerant containing a hydrofluoroolefin.

The compressor of a second aspect is the compressor of the first aspect, in which the refrigeration oil contains an extreme pressure additive.

The compressor of a third aspect is the compressor of the first or second aspect, in which the refrigeration oil contains an antioxidant.

The refrigeration cycle apparatus of a fourth aspect includes the compressor according to any one of the first to third aspects.

EXAMPLES

The present disclosure will be described based on the following examples. It is noted that the present disclosure is not limited to the examples described below.

Test results for refrigeration oils for use in the compressor and refrigeration cycle apparatus of this embodiment will be described. In testing of the refrigeration oils, a thrust sliding test was performed using test specimens shown in Table 1 to analyze the effect of the refrigeration oils on the compressor and the refrigeration cycle apparatus.

TABLE 1

| | | | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|
| Refrigerant | R1234yf (wt %) | | 100.0 | 78.5 | 31.1 | 100.0 | 78.5 | 31.1 | 0.0 | 100.0 | 31.1 | 100.0 | 31.1 | 100.0 |
| | R32 (wt %) | | 0.0 | 21.5 | 68.9 | 0.0 | 21.5 | 68.9 | 100.0 | 0.0 | 68.9 | 0.0 | 68.9 | 0.0 |
| Test specimen | Ring | Material | Al alloy | Al alloy | Al alloy | Al alloy | Al alloy | Al alloy | Al alloy | Al alloy | Al alloy | Al alloy | Al alloy | Al alloy |
| | | Si content (wt %) | 8.0 | 8.0 | 8.0 | 12.5 | 12.5 | 12.5 | 8.0 | 8.0 | 8.0 | 12.5 | 12.5 | 12.5 |
| | Disc | Material | Cast iron | Cast iron | Cast iron | Cast iron | Cast iron | Cast iron | Cast iron | Cast iron | Cast iron | Cast iron | Cast iron | Cast iron |
| Amount (wt %) of acid scavenger + oxygen scavenger added | | | 3.6 | 3.0 | 1.8 | 2.9 | 2.3 | 1.1 | 1.0 | 0.0 | 0.0 | 0.0 | 0.0 | 2.0 |
| Amount (wt %) of acid scavenger + oxygen scavenger added as calculated from relational formula | | | 2.5 | 1.9 | 0.7 | 2.4 | 1.9 | 0.6 | −0.1 | 2.5 | 0.7 | 2.4 | 0.6 | 2.4 |
| Seizure surface pressure relative to that of existing product | | | High | High | High | High | High | High | High | Low | Low | Low | Low | Low |

As the refrigeration oils, mixtures of a polyvinyl ether with an acid scavenger and an oxygen scavenger in the amounts shown in Table 1 were used.

In testing, the types and amounts of refrigerants, the silicon content in the aluminum alloys used for the test specimens, and the total amount of acid scavenger and oxygen scavenger added to the refrigeration oils were varied. The refrigeration oils were applied to discs, and a thrust sliding test was performed. As the test conditions, the speed was set to 5 cm/sec. The surface pressure at which ring seizure occurred in the thrust sliding test (hereinafter referred to as "seizure surface pressure") (MPa) was measured and compared with that of an existing product. The test results are shown in Table 1.

As shown in Table 1, the seizure surface pressures of Examples 1 to 6, in which the total amount of acid scavenger and oxygen scavenger added was more than or equal to the total amount of acid scavenger and oxygen scavenger added as calculated from the relational formula, were higher than that of the existing product.

The seizure surface pressures of Comparative Examples 2 to 6, in which the total amount of acid scavenger and oxygen scavenger added was less than the total amount of acid scavenger and oxygen scavenger added as calculated from the relational formula, were lower than that of the existing product. Note that Comparative Example 1 did not include a hydrofluoroolefin containing refrigerant.

While embodiments of the present disclosure have been described above, it is to be appreciated that various changes in form and detail may be made without departing from the spirit and scope of the present disclosure as recited in the claims.

INDUSTRIAL APPLICABILITY

As described above, the present disclosure is useful for refrigeration cycle apparatuses and compressors that perform a refrigeration cycle.

REFERENCE SIGNS LIST

10 refrigerant circuit
20 air conditioning apparatus (refrigeration cycle apparatus)
30 compressor
73 compression chamber
75 fixed scroll
76 movable scroll
79 Oldham ring
**79*s*** sliding portion
82 compression mechanism

CITATION LIST

Patent Literature

[Patent Document 1] Japanese Unexamined Patent Application Publication No. 2010-265777

The invention claimed is:

1. A compressor for a refrigeration cycle apparatus that performs a refrigeration cycle using a refrigerant and a refrigeration oil, the refrigerant containing a hydrofluoroolefin and the refrigeration oil containing a polyol ester or a polyvinyl ether, the compressor comprising:

a sliding portion comprising an aluminum alloy containing from 7 wt % to 20 wt % of silicon, wherein the refrigeration oil contains an acid scavenger and an oxygen scavenger, the total content of acid scavenger and oxygen scavenger in the refrigeration oil being 1.1 wt % to 3.6 wt %, the hydrofluoroolefin content in the refrigerant is 30 wt % to 100 wt %, the acid scavenger includes one or more epoxy compounds, the oxygen scavenger includes one or more compounds selected from a group consisting of sulfur-containing aromatic compounds, aliphatic unsaturated compounds, and terpenes having a double bond, and the refrigeration oil satisfies the following relational formula:

$$\text{total content (wt \%) of acid scavenger and oxygen scavenger in refrigeration oil} \geq (2.3 + 2.6 \times (\text{hydrofluoroolefin content (wt \%) in refrigerant}) - 1.6 \times (\text{silicon content (wt \%) in sliding portion}))/100.$$

2. The compressor according to claim 1, wherein the refrigeration oil contains an extreme pressure additive.

3. The compressor according to claim 1, wherein the refrigeration oil contains an antioxidant.

4. A refrigeration cycle apparatus comprising the compressor according to claim 1.

5. The compressor according to claim 2, wherein the refrigeration oil contains an antioxidant.

6. A refrigeration cycle apparatus comprising the compressor according to claim 2.

7. A refrigeration cycle apparatus comprising the compressor according to claim 3.

* * * * *